United States Patent
Kim et al.

(10) Patent No.: US 12,054,595 B2
(45) Date of Patent: Aug. 6, 2024

(54) METHOD FOR IMPROVING PHYSICAL PROPERTIES OF SEPARATOR BY POST-TREATMENT CROSSLINKING AND SEPARATOR PREPARED THEREBY

(71) Applicant: LG CHEM, LTD., Seoul (KR)

(72) Inventors: Young Bok Kim, Daejeon (KR); Min Ji Kim, Daejeon (KR); Kwan Woo Nam, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 748 days.

(21) Appl. No.: 16/646,595

(22) PCT Filed: Apr. 13, 2019

(86) PCT No.: PCT/KR2019/004477
§ 371 (c)(1),
(2) Date: Mar. 12, 2020

(87) PCT Pub. No.: WO2019/199137
PCT Pub. Date: Oct. 17, 2019

(65) Prior Publication Data
US 2020/0287187 A1   Sep. 10, 2020

(30) Foreign Application Priority Data

Apr. 13, 2018 (KR) .................. 10-2018-0043356
Apr. 12, 2019 (KR) .................. 10-2019-0042803

(51) Int. Cl.
| | |
|---|---|
| *C08J 7/16* | (2006.01) |
| *C08K 3/22* | (2006.01) |
| *C08K 5/00* | (2006.01) |
| *C08K 5/14* | (2006.01) |
| *C08K 5/17* | (2006.01) |
| *C08K 5/23* | (2006.01) |
| *H01M 50/403* | (2021.01) |
| *H01M 50/414* | (2021.01) |
| *H01M 50/446* | (2021.01) |
| *H01M 50/449* | (2021.01) |
| *H01M 50/46* | (2021.01) |
| *H01M 50/489* | (2021.01) |
| *H01M 50/494* | (2021.01) |

(52) U.S. Cl.
CPC ...... *C08J 7/16* (2013.01); *C08K 3/22* (2013.01); *C08K 5/0025* (2013.01); *C08K 5/14* (2013.01); *C08K 5/17* (2013.01); *C08K 5/23* (2013.01); *H01M 50/403* (2021.01); *H01M 50/414* (2021.01); *H01M 50/446* (2021.01); *H01M 50/449* (2021.01); *H01M 50/461* (2021.01); *H01M 50/489* (2021.01); *H01M 50/494* (2021.01); *C08J 2300/00* (2013.01); *C08K 2003/2227* (2013.01); *C08K 2201/001* (2013.01)

(58) Field of Classification Search
None
See application file for complete search history.

(56) References Cited

U.S. PATENT DOCUMENTS

| | | | | |
|---|---|---|---|---|
| 5,395,886 | A * | 3/1995 | Caporiccio | C08F 8/00 525/326.3 |
| 5,629,084 | A * | 5/1997 | Moya | B01D 67/0088 428/315.7 |
| 6,077,624 | A * | 6/2000 | Mitchell | H01M 4/623 429/212 |
| 6,423,447 | B1 | 7/2002 | Ohsaki et al. | |
| 6,890,684 | B2 | 5/2005 | Ohsaki et al. | |
| 8,372,475 | B2 | 2/2013 | Kim et al. | |
| 8,883,354 | B2 | 11/2014 | Carlson et al. | |
| 9,130,215 | B2 | 9/2015 | Ha et al. | |
| 9,954,211 | B2 | 4/2018 | Ha et al. | |
| 2002/0001721 | A1* | 1/2002 | Barriere | C09J 127/22 428/408 |
| 2003/0035995 | A1 | 2/2003 | Ohsaki et al. | |
| 2007/0232175 | A1 | 10/2007 | Katayama et al. | |
| 2008/0058440 | A1* | 3/2008 | Muller | B01J 20/28021 525/379 |
| 2010/0316903 | A1 | 12/2010 | Kim et al. | |
| 2011/0027658 | A1 | 2/2011 | Kim et al. | |

(Continued)

FOREIGN PATENT DOCUMENTS

| | | | | |
|---|---|---|---|---|
| CA | | 2341214 A1 * | 3/2000 | |
| CA | | 2308988 A1 * | 11/2000 | ........ C08J 7/12 |

(Continued)

OTHER PUBLICATIONS

Machine translation of CN 105363357 A, retrieved Dec. 2022 (Year: 2022).*
EPO Machine translation of KR 10-20160022619 A, retrieved Dec. 2022 (Year: 2022).*
Jeong, "Synthesis of an aminated poly(vinylidene fluoride-g-4-vinyl benzy chloride) anion exchanged membrane for membrane capacitive deionization", Journal of Membrane Science, 495, (2015), 316-321 (Year: 2015).*
Taguet. Crosslinking of Vinylidene Fluoride-Containing Fluoropolymers. Advances in polymer science, 2005, 184, pp. 127-211. ff10.1007/b136245ff. ffhal-00381856f (Year: 2005).*

(Continued)

*Primary Examiner* — Nicole M. Buie-Hatcher
(74) *Attorney, Agent, or Firm* — Birch, Stewart, Kolasch & Birch, LLP (57) ABSTRACT

A method for improving physical properties of a separator in which is capable of increasing insulation, tensile strength and elongation. The separator also has improved physical properties through the above method. Particularly, the present invention is applied to a separator that has already manufactured. After forming a double bond in the separator that has already manufactured, crosslinking may be formed through the double bond or by adding a separate crosslinking initiator.

10 Claims, 6 Drawing Sheets

(56) References Cited

U.S. PATENT DOCUMENTS

| | | | |
|---|---|---|---|
| 2012/0108753 A1* | 5/2012 | Takemura | C08L 27/12 525/199 |
| 2013/0171501 A1 | 7/2013 | Son et al. | |
| 2014/0050965 A1 | 2/2014 | Ha et al. | |
| 2015/0349312 A1 | 12/2015 | Ha et al. | |
| 2016/0056438 A1 | 2/2016 | Kim et al. | |
| 2016/0351956 A1 | 12/2016 | Lee et al. | |
| 2020/0358065 A1* | 11/2020 | Kim | H01M 50/446 |

FOREIGN PATENT DOCUMENTS

| | | | | |
|---|---|---|---|---|
| CN | 105363357 A | * | 3/2016 | |
| JP | 10-3897 A | | 1/1998 | |
| JP | 2000-268872 A | | 9/2000 | |
| JP | 2005-340135 A | | 12/2005 | |
| KR | 10-2007-0058660 A | | 6/2007 | |
| KR | 10-2009-0056811 A | | 6/2009 | |
| KR | 10-2010-0047936 A | | 5/2010 | |
| KR | 10-2011-0011932 A | | 2/2011 | |
| KR | 10-2012-0024508 A | | 3/2012 | |
| KR | 10-2012-0093772 A | | 8/2012 | |
| KR | 10-2015-0099648 A | | 9/2015 | |
| KR | 10-2016-0022619 A | | 3/2016 | |
| KR | 10-2016-0129580 A | | 11/2016 | |
| KR | 10-2016-0129868 A | | 11/2016 | |
| KR | 10-2016-0140211 A | | 12/2016 | |
| KR | 10-2017-0076552 A | | 7/2017 | |
| WO | WO-2010078721 A1 | * | 7/2010 | B01D 67/0093 |
| WO | WO-2019088698 A2 | * | 5/2019 | H01M 10/052 |

OTHER PUBLICATIONS

Machine translation of WO 2010/078721 A1, retrieved Dec. 2022 (Year: 2022).*

Cui, "Recent progress in fluoropolymers for membranes", Progress in Polymer Science 39 (2014) 164-198. (Year: 2014).*

Cheng et al., "Thermal shutdown behavior of PVdF-HFP based polymer electrolytes comprising heat sensitive cross-linkable oligomers", Journal of Power Sources, vol. 144, 2005, pp. 238-243.

Dao et al., "Effects of Cross-linking on the Electrical Properties of LDPE and its Lightning Impulse Ageing Characteristics", XVII International Symposium on High Voltage Engineering, Hannover, Germany, Aug. 22-26, 2011, pp. 1-6.

Holtmann et al., "Boehmite-based ceramic separator for lithium-ion batteries", Journal of Applied Electrochemistry, vol. 46, 2016, pp. 69-76.

International Search Report issued in PCT/KR2019/004477 (PCT/ISA/210), dated Jul. 11, 2019.

Obaid et al., "A novel strategy for enhancing the electrospun PVDF support layer of thin-film composite forward osmosis membranes", RSC Adv., vol. 6, 2016, pp. 102762-102772 (Total No. pp. 17).

Raja et al., "Thin, flexible and thermally stable ceramic membranes as separator for lithium-ion batteries", Journal of Membrane Science, vol. 471, 2014, 103-109.

Sridhar et al., "Development of crosslinked poly(ether-block-amide) membrane for $CO_2/CH_4$ separation", Colloids and Surfaces A: Physicochem. Eng. Aspects, vol. 297, 2007, pp. 267-274.

Thomas, "Heat Aging in Fluoroelastomers", Journal of Applied Polymer Science, vol. 8, 1964. pp. 1415-1427.

* cited by examiner

METHOD FOR IMPROVING PHYSICAL PROPERTIES OF SEPARATOR BY POST-TREATMENT CROSSLINKING AND SEPARATOR PREPARED THEREBY

TECHNICAL FIELD

This application claims priority to and the benefit of Korean Patent Application No. 2018-0043356 filed on Apr. 13, 2018 and Korean Patent Application No. 2019-0042803 filed on Apr. 12, 2019, the disclosures of all of which are hereby incorporated herein by reference herein in their entireties.

The present invention relates to a method for improving physical properties of a separator by post-treatment crosslinking and a separator prepared thereby. Particularly, this invention relates to a method, which comprises forming crosslinkable sites on a binder molecule through post-treatment of a completed separator including an olefin substrate or no olefin substrate and crosslinking the crosslinkable sites to improve insulation properties and mechanical properties of the separator, and a separator having improved physical properties by the post-treatment crosslinking. The separator of the present invention may be used for batteries, and particularly for secondary batteries.

BACKGROUND ART

With the recent trends toward reducing the weight and increasing the functionality of portable devices, such as smartphones, laptop computers, tablet PCs, and portable game machines, the demand for a secondary battery serving as a driving power source thereof is increasing. In the past, nickel-cadmium, nickel-hydrogen, and nickel-zinc batteries have been used, but lithium secondary batteries, which have high operating voltage and high energy density per unit weight, are most frequently used at present.

In the case of lithium secondary batteries, the demand for lithium secondary batteries has increased with the growth of markets related to the portable device market. Lithium secondary batteries have also come to be used as the power sources for electric vehicles (EV) and hybrid electric vehicles (HEV).

A lithium secondary battery is configured such that an electrode assembly having a positive electrode/separator/negative electrode structure, which can be charged and discharged, is mounted in a battery case. Each of the positive electrode and the negative electrode is manufactured by applying a slurry including an electrode active material to one surface or both surfaces of a metal current collector, drying the slurry, and rolling the metal current collector having the dried slurry applied thereto.

The separator is one of the most important factors that affect the performance and the lifespan of a secondary battery. The separator should electrically isolate the positive electrode and the negative electrode from each other and should allow an electrolytic solution to pass smoothly through the separator. In addition, it is desirable for the separator to exhibit high mechanical strength and stability at high temperature.

Various attempts have been made to increase insulation resistance and mechanical strength of the separator. In the case of a lithium ion battery, a low voltage phenomenon due to self-discharge is a problem, and a low insulation resistance of the separator is an important cause.

U.S. Pat. No. 8,883,354 discloses a microporous polymer layer comprising organically-modified aluminum boehmite particles and an organic polymer. However, there is a problem in that it shows a high defect rate in the process due to poor mechanical strength.

Korean Patent Application Publication No. 2016-0140211 relates to an electrolyte for a lithium battery, and a negative electrode and a lithium battery including the same, and discloses an interlayer comprising an electrolyte and a solid electrolyte between a positive electrode and the negative electrode and acting as a separator. The electrolyte is interposed between the positive electrode and the negative electrode or may comprise the separator, which corresponds to the present invention. There is a difference from the present invention in that a surface-modified nanoparticle composite is dispersed in a block copolymer.

Korean Patent Application Publication No. 2012-0093772 discloses a separator comprising a binder including an amine group and a separator coating layer including the same; and a monomer unit having a crosslinkable functional group. However, this patent document does not disclose a specific step of adding a solution including a basic substance or a substance having an amine group.

Journal of Power Sources 144(1):238-243, June 2005 discloses a crosslinking of PVdF-HFP/PEGDMA (polyethylene glycol dimethacrylate). However, this non-patent document does not disclose the application of the PVdF-HFP/PEGDMA to a separator but applies only to a polymer electrolyte.

J Appl Electrochem 46: 69, 2016 discloses boehmite nanoparticles and a polyvinylidene fluoride polymer as separators for lithium secondary batteries. However, this non-patent document mentions that it is inadequate to apply to a battery cell assembly process, which has high stress.

Journal of Membrane Science, (471)103, 2014 discloses a porous ceramic film based on magnesium aluminate as a separator for a lithium secondary battery having flexibility and thermal stability. However, this non-patent document does not disclose a method for improving the strength.

RSC Adv., 6, 102762-102772, 2016 relates to a method for improving the physical properties of a forward osmosis separator and relates to a thin film composite (TFC) separator in which m-phenylene diamine (MPD) and trimesoyl chloride (TMC) are coupled with an electrospun PVDF support. The electrospun PVDF support was treated with triethyl amine (TEA) in order to increase the hydrophilicity and the like of the electrospun PVDF support.

J. Appl. Polym. Sci. 8, 1415, 1964 discloses a crosslinking mechanism by post-treatment of a separator. Colloids and surfaces a:Physicochem. Eng. Aspects 297, 267, 2007 discloses the effect of improving the mechanical properties of a crosslinked separator. "Effect of crosslinking on the electrical properties of LDPE and its lightning impulse ageing characteristics," International Symposium on High Voltage Engineering", Hannover, Germany, 2011, Aug. 22 discloses that the insulating properties of a crosslinked separator are improved.

Meanwhile, a conventional method for improving the properties of a separator and the like has improved the physical properties of the separator by adding additional means or processes during the manufacturing process of the separator. However, a method for improving the physical properties of a separator through the post-treatment of a separator already manufactured has not yet been suggested.

DISCLOSURE

Technical Problem

The present invention has been made in view of the above problems, and it is an object of the present invention to provide a method for improving physical properties of a separator, in which is capable of increasing insulation, tensile strength and elongation, and a separator having improved physical properties therethrough. Particularly, the present invention is characterized in that it is applied to a separator already manufactured.

Technical Solution

In a first aspect of the present invention, the above and other objects can be accomplished by the provision of a method for improving physical properties of a separator through post-treatment, comprising the steps of: a) preparing a separator having a layer comprising a binder, said layer present on an optional polyolefin substrate; b) transforming the binder into a crosslinkable coupling part by performing deintercalation of elements present in the binder; and c) treating the separator with a crosslinking initiator and/or a reaction catalyst after the deintercalation in step b).

In addition to the crosslinking initiator in the step c), a crosslinking agent may be added at the same time in step c).

The separator having the layer comprising the binder comprising the polyolefin substrate or no polyolefin substrate may have a layer comprising a binder on a polyolefin substrate. Alternatively, the separator may comprise no polyolefin substrate, and comprise inorganic particles and a binder, wherein the binder couples the inorganic particles.

The inorganic particles may be high-dielectric inorganic particles having a dielectric constant of 1 or more, inorganic particles having piezoelectricity, inorganic particles having lithium ion transfer ability, alumina hydrate, or a mixture of two or more thereof.

The examples of the binder include at least one selected from a group consisting of PVdF, TFE, and polyimide.

Particularly, in the step b), deintercalation of elements present in the binder may be performed to transform a single bond into a double bond. Alternatively, in the step b), a solution comprising a basic substance or a substance including an amine group may be added to the separator. The basic substance or the substance including an amine group may be at least one selected from among alkali metal oxide, alkaline earth metal oxide, zeolite, limestone, sodium carbonate, ammonia, mono-alkyl amine, bi-alkyl amine, tri-alkyl amine, wherein the alkyl may contain 1 to 10 carbon atoms.

As the crosslinking initiator, an azo-based compound or a peroxide-based compound may be used.

The crosslinking agent may be selected from at least one of diaminoalkanes having 1 to 15 carbon atoms. Specific examples of the diaminoalkane may include 1,6-diaminohexane and 1,5-diaminopentane.

A second aspect of the present invention provides a separator having improved physical properties by the method for improving the physical properties of the separator of the present invention. For instance, in an aspect, the separator may have an air permeability in a range of 50 sec/100 cc to 4,000 sec/100 cc.

A third aspect of the present invention provides an electrochemical device comprising the separator having improved physical properties.

Advantageous Effects of Invention

The method for improving physical properties of a separator according to the present invention is advantageous in that it is capable of providing a separator with improved insulation and tensile strength compared with conventional separators. The present invention can be applied to a separator including a polyolefin substrate or no polyolefin substrate. In particular, while the conventional method is applied to a process for manufacturing a separator, the present invention provides an entirely different approach in that it improves the physical properties of a separator already manufactured. The present invention is advantageous in that it is not necessary to change the composition and process conditions of a conventional mass-production separator.

BEST MODE

Hereinafter, the present invention will be described in detail. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method. Consequently, the embodiments described in this specification are merely the most preferred embodiments and do not cover all technical ideas of the present invention, and therefore it should be understood that there may be various equivalents and modifications capable of substituting for the embodiments at the time of filing of the present application.

In accordance with an aspect of the present invention, there is provided a method for improving physical properties of a separator by post-treatment, comprising the steps of: a) preparing a separator having a layer comprising a binder including a polyolefin substrate or no polyolefin substrate; b) transforming the binder into a crosslinkable coupling part by performing deintercalation of some elements of the binder; and c) treating the separator with a crosslinking initiator and/or a reaction catalyst after the treatment of the step b).

In the step b), crosslinking sites may be formed by performing deintercalation of some elements of the binder so as to transform a single bond into a double bond. The some elements may be H, F or Cl.

In the step b), a solution containing a basic substance or a substance including an amine group may be added to the separator.

In the step c), a crosslinking agent may be selectively added at the same time in addition to the crosslinking initiator.

The step c) may comprise a step of coupling the crosslinking initiator to the coupling part, coupling between the binders at the coupling part, forming a separate crosslinking between the crosslinking initiators, coupling the crosslinking agent to the coupling part, or forming a separate crosslinking between the crosslinking agents.

H, F, Cl and the like in binder polymers may be deintercalated to form a double bond so as to transform to a crosslinkable coupling part in the step b). Crosslinking may be formed by coupling between the crosslinking sites formed in the step b), the crosslinking initiator, the crosslinking agent and/or the reaction catalyst injected in the step c) may couple the crosslinking sites, or a separate crosslinking may be formed between the crosslinking initiator and the crosslinking agent.

1) Type of Separator

The separator having a layer comprising a binder including a polyolefin substrate or no polyolefin substrate may be a separator having a coating layer comprising a binder on a polyolefin substrate, or a separator comprising no polyolefin substrate and comprising inorganic particles and a binder for coupling between the inorganic particles.

The polyolefin substrate may be polyethylene, polypropylene, and the like as a polyolefin substrate used in a conventional separator. The technical details of the polyolefin substrate are well known to those of ordinary skill in the art, and a detailed description thereof will be omitted.

In a structure including no polyolefin-based separator substrate, a conventional separator substrate is omitted, and a separator is made of materials constituting an inorganic layer. Since the separator includes no polyolefin separator substrate, the overall strength of the separator made solely of such an inorganic layer is low. Consequently, there is a problem that the separator interposed between electrode assemblies may be damaged, whereby a short circuit may occur. The method for improving the physical properties of a separator according to the present invention may be applied to the separator having no polyolefin-based separator substrate, which has already been completed, thereby increasing mechanical strength and insulation characteristics.

2) Inorganic Particles

The inorganic particles according to the present invention may form empty spaces among the inorganic particles, and thereby may form micro pores and maintain a physical shape as a spacer. The physical characteristics of the inorganic particles are not generally changed at a temperature of 200° C. or more.

The inorganic particles are not particularly restricted, as long as the inorganic particles are electrochemically stable. In other words, the inorganic particles that may be used in the present invention are not particularly restricted as long as the inorganic particles are not oxidized and/or reduced within the operating voltage range (e.g. 0 to 5 V based on Li/Li+) of a battery to which the inorganic particles are applied. Particularly, in the case in which inorganic particles having high electrolyte ion transfer ability are used, it is possible to improve the performance of an electrochemical device. Consequently, it is preferable for the electrolyte ion transfer ability of the inorganic particles to be as high as possible. In addition, in the case in which the inorganic particles have high density, it may be difficult to disperse the inorganic particles at the time of forming the porous separator, and the weight of a battery may increase at the time of manufacturing the battery. For these reasons, it is preferable for the density of the inorganic particles to be low. In addition, in the case in which the inorganic particles have high permittivity, the degree of dissociation of electrolyte salt, such as lithium salt, in a liquid electrolyte may increase, thereby improving the ion conductivity of the electrolytic solution.

For the reasons described above, the inorganic particles may be high-dielectric inorganic particles having a dielectric constant of 1 or more, preferably 10 or more, inorganic particles having piezoelectricity, inorganic particles having lithium ion transfer ability, alumina hydrate, or a mixture of two or more thereof.

Examples of the inorganic particles having a dielectric constant of 1 or more may include $SrTiO_3$, $SnO_2$, $CeO_2$, MgO, NiO, CaO, ZnO, $ZrO_2$, $Y_2O_3$, $Al_2O_3$, $TiO_2$, SiC, or a mixture thereof. However, the present invention is not limited thereto.

The inorganic particles having piezoelectricity are a material that is a nonconductor at normal pressure but, when a predetermined pressure is applied thereto, exhibits conductivity due to a change in the internal structure thereof. In the case in which the inorganic particles have a high dielectric value, e.g. a dielectric constant of 100 or more, and the inorganic particles are tensioned or compressed with a predetermined pressure, electric charges are generated. One face is charged as a positive pole and the other face is charged as a negative pole, whereby a potential difference is generated between the two faces.

In the case in which inorganic particles having the above-mentioned characteristics are used, a short circuit may occur in both electrodes in the event of an external impact, such as local crushing or an impact with a nail. At this time, however, the positive electrode and the negative electrode may not directly contact each other due to the inorganic particles coated on the porous separator, and potential differences in particles may occur due to the piezoelectricity of the inorganic particles. Accordingly, electron migration, namely, fine current flow, is achieved between the two electrodes, whereby the voltage of the battery is gradually reduced, and therefore the stability of the battery may be improved.

Examples of the inorganic particles having piezoelectricity may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT) hafnia ($HfO_2$), and a mixture thereof. However, the present invention is not limited thereto.

The inorganic particles having lithium ion transfer ability are inorganic particles that contain lithium elements and transport lithium ions without storing lithium. The inorganic particles having lithium ion transfer ability may transfer and transport lithium ions due to a kind of defect present in a particle structure. Consequently, lithium ionic conductivity in the battery may be improved, and therefore the battery performance may be improved.

Examples of the inorganic particles having lithium ion transfer ability may include lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$) such as $14Li_2O$-$9Al_2O_3$-$38TiO_2$-$39P_2O_5$, lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$) such as $Li_{3.25}Ge_{0.25}P_{0.75}S_4$, lithium nitride ($Li_xN_y$, where $0<x<4$ and $0<y<2$) such as $Li_3N$, $SiS_2$-based glass ($Li_xSi_yS_z$, where $0<x<3$, $0<y<2$, and $0<z<4$) such as $Li_3PO_4$—$Li_2S$—$SiS_2$, $P_2S_5$-based glass ($Li_xP_yS_z$, where $0<x<3$, $0<y<3$, and $0<z<7$) such as $LiI$—$Li_2S$—$P_2S_5$, and a mixture thereof. However, the present invention is not limited thereto.

The alumina hydrate may be classified as crystalline alumina hydrate or gel-type alumina hydrate depending on the method of manufacturing the same. Examples of the crystalline alumina hydrate may include gibbsite γ-Al(OH)$_3$, bayerite Al(OH)$_3$, diaspore α-AlOOH, and boehmite γ-AlOOH, and the gel-type alumina hydrate may be aluminum hydroxide, which is prepared by depositing an aqueous solution containing aluminum ions using ammonia. Preferably, boehmite γ-AlOOH may be used as the gel-type alumina hydrate.

In the case in which the inorganic particles having high permittivity, the inorganic particles having piezoelectricity, the inorganic particles having lithium ion transfer ability, and the alumina hydrate are used together, the effects obtained through these ingredients may be further improved.

The size of each of the inorganic particles is not particularly restricted. In order to form a film having a uniform thickness and to achieve appropriate porosity, however, each of the inorganic particles may have a size of 0.001 μm to 10 μm. In the case in which the size of each of the inorganic particles is less than 0.001 μm, dispersibility is reduced, whereby it is difficult to adjust the physical properties of the porous separator. In the case in which the size of each of the inorganic particles is greater than 10 μm, the thickness of a separator manufactured with the same content of a solid body is increased, whereby the mechanical properties of the separator are deteriorated. In addition, a short circuit may easily occur in the battery when the battery is charged and discharged due to excessively large-sized pores.

3) Binder

The binder may also be commonly referred to as a polymer binder and may become a gel when the binder is impregnated with a liquid electrolytic solution, whereby the binder may have a characteristic of exhibiting high rate of electrolytic solution impregnation (degree of swelling). In fact, for the binder polymer having a high rate of electrolytic solution impregnation, an electrolytic solution injected after the assembly of a battery permeates into the polymer, and the polymer impregnated with the electrolytic solution exhibits electrolyte ion transfer ability. In addition, compared to a conventional hydrophobic polyolefin-based separator, wetting of the porous separator in the electrolytic solution may be improved, and it is possible to use polar electrolytic solutions for batteries, which has been difficult to use conventionally. Consequently, the binder may have a polymer with solubility parameter of 15 MPa$^{1/2}$ to 45 MPa$^{1/2}$, preferably 15 MPa$^{1/2}$ to 25 MPa$^{1/2}$ and 30 MPa$^{1/2}$ to 45 MPa$^{1/2}$. In the case in which the solubility parameter of the binder is less than 15 MPa$^{1/2}$ and greater than 45 MPa$^{1/2}$, it is difficult to impregnate the binder with a conventional electrolytic solution for batteries.

Specifically, the binder may be at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), TFE, fluoro rubber, and polyimide. Preferably, the binder may be at least one selected from the group consisting of PVdF, TFE and polyimide.

4) Basic Substance or Substance Having Amine Group

The basic substance or the substance having an amine group is at least one selected from the group among alkali metal oxide, alkaline earth metal oxide, zeolite, limestone, sodium carbonate, ammonia, mono-alkyl amine, bi-alkyl amine and tri-alkyl amine.

5) Crosslinking Initiator

The crosslinking initiator may be an azo-based compound or a peroxide-based compound. Specifically, the azo-based compound may be at least one selected from among 2,2'-azobis(2-methylbutyronitrile), 2,2'-azobis(isobutyronitrile), 2,2'-azobis(2,4-dimethylvaleronitrile), and 2,2'-azobis(4-methoxy-2,4-dimethylvaleronitrile). Preferably, the azo-based compound is 2,2'-azobis(isobutyronitrile) (AIBN).

The peroxide-based compound may be at least one selected from among tetramethylbutyl peroxyneodecanoate, bis(4-butylcyclohexyl)peroxydicarbonate, di(2-ethylhexyl) peroxydicarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethylhydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide.

The amount of the crosslinking initiator, the crosslinking agent, and/or the reaction catalyst may be greater than 0 wt % and equal to or less than 5 wt %, preferably greater than 0.2 wt % and equal to or less than 5 wt %, more preferably greater than 0.5 wt % and equal to or less than 5 wt %, and most preferably greater than 1 wt % and equal to or less than 2 wt % based on a total weight of a solid body in the separator.

In the case in which the amount of the crosslinking initiator, the crosslinking agent and/or the reaction catalyst in the separator is lower than the lower limit, the crosslinking may not be completely performed.

In the present invention, the crosslinking initiator may react at a specific temperature to have the crosslinking agent form a crosslinked structure. As the density of the separator of the present invention increases due to the characteristics of the crosslinked structure, physical properties related to rigidity of the separator may be improved. Consequently, as the migration of electrons is affected, the insulation resistance may be increased.

The reaction temperature of the crosslinking initiator may be in the range of 40° C. to 150° C., preferably 50° C. to 130° C. The reaction rate of the crosslinking initiator is slow at temperatures lower than the above reaction temperature range. The crosslinking initiator reacts when the reaction temperature of the crosslinking initiator reaches the above reaction temperature range, whereby a three-dimensional net-shaped structure is formed through crosslinking.

In the case in which the reaction temperature of the crosslinking initiator is lower than 40° C., it is difficult for the crosslinking initiator to perform a crosslinking reaction, which is undesirable. In the case in which the reaction temperature of the crosslinking initiator is higher than 150° C., the conventional separator may be deformed or may melt, which is also undesirable.

5) Crosslinking Agent

The crosslinking agent may be selected from at least one of diaminoalkanes having 1 to 15 carbon atoms. Particularly, the crosslinking agent may be selected from at least one of 1,6-diaminohexane or 1,5-diaminopentane.

6) Construction and Application of Electrode Assembly

The present invention also provides an electrochemical device including a positive electrode, a negative electrode, the separator interposed between the positive electrode and the negative electrode, and an electrolyte. Here, the electrochemical device may be a lithium secondary battery.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 μm to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added in an amount of 1 to 30 wt % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, 2 and 3 elements of the periodic table, halogen; 0<x≤1; 1≤y≤3; 1≤z≤8); lithium metal; lithium alloy; silicon-based alloy; tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; a conductive polymer, such as polyacetylene; or a Li—Co—Ni based material.

In accordance with another aspect of the present invention, there is provided a battery pack including the electrochemical device.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and a power storage system. However, the present invention is not limited thereto.

The structure and manufacturing method of the device are well known in the art to which the present invention pertains, and a detailed description thereof will be omitted.

EMBODIMENTS

Hereinafter, the present invention will be described in detail with reference to the following Examples and Experimental Example; however, the present invention is not limited by the Examples and the Experimental Example. The Examples may be modified into various other forms, and the scope of the present invention should not be interpreted as being limited by the Examples, which will be described in detail. The Examples are provided in order to more completely explain the prevent invention to a person who has average knowledge in the art to which the present invention pertains.

Manufacturing Method (Manufacture of Separators 1 and 2)

For the purpose of experiments, two kinds of separators, CSP gen1 (separator 1), and BA1_BO9PA1 (separator 2), which were already produced, were used. The CSP gen1 separator is made only of aluminum oxide $Al_2O_3$ particles and PVDF binder. The BA1_B09PA1 separator has a coating layer comprising $Al_2O_3$ inorganic particles and PVDF binder on a polyethylene substrate.

Triethylamine (TEA) was used as a material for forming crosslinking sites. After each of the separators was cut to a size of 10 cm×10 cm, the separators were immersed in 99% TEA solution at ambient temperature for 5 minutes, and then the separators were taken out and dried in a fume hood.

In order to have crosslinking, the separators having crosslinking sites were immersed in a solution in which 1.5 wt % of 2,2'-azobis(isobutyronitrile) (AIBN) was dissolved in an ethanol solvent and were treated at 60° C. for 30 minutes. The separators were then washed with ethanol and dried in a fume hood.

Comparative Experiment 1

Comparative Examples 1 and 2 were prepared by performing no treatment to the separators 1 and 2. Examples 1 and 2 were prepared by performing only TEA treatment to the separators 1 and 2 according to the present invention. Examples 3 and 4 were prepared by performing TEA and AIBN treatment to the separators 1 and 2. The tensile strength, the elongation, the insulation resistance, and the resistance of the separators of Comparative Examples 1 and 2, Examples 1 and 2, and Examples 3 and 4 were measured respectively with the following conditions.
<Measurement Condition of Insulation Resistance>
  Applied voltage: 100V
  Measurement time: 3 S
  Size and shape of electrode: 19.6 cm² circular
<Measurement Condition of Tensile Strength>
  Width of separator: 2 cm
  Tensile speed: 500 mm/min
<Experiment Result>
FIGS. 1 to 4 show the measurement results of physical properties of Comparative Examples 1 and 2, and Examples 1, 2, 3 and 4 according to the present invention, respectively. In the Gen1 separator, Bare is Comparative Example 1 having no treatment applied, TEA is Example 1, and TEA+AIBN is Example 3. In the BA1 separator, Bare is Comparative Example 2 having no treatment applied, TEA is Example 2, and TEA+AIBN is Example 4.

The insulation property (volume resistance) and mechanical strength of the separator after TEA treatment for forming crosslinking sites showed a decrease in Example 1 but were increased in Example 2. Moreover, the insulation property (volume resistance) and mechanical strength of the separator after AIBN solution treatment for forming crosslinking sites were increased in Examples 3 and 4. Particularly, it can be confirmed that the insulation property and mechanical strength are increased in all separators in the case of AIBN treatment. It can be seen that the method for improving the physical properties of a separator through post-treatment according to the present invention may be applied to the separator already produced as described above to improve the physical properties of the separator.

Comparative Experiment 2

Figure 1:
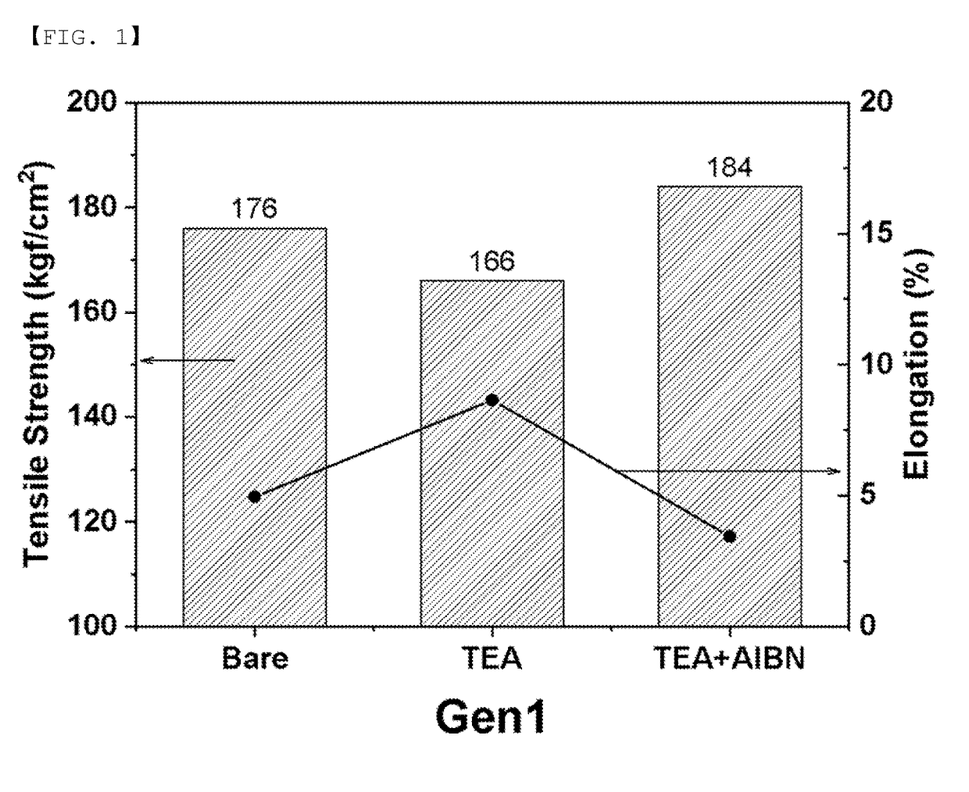
FIG. 1 is a graph showing the comparative measurement of tensile strength and elongation of a GEN 1 separator.
Figure 2:
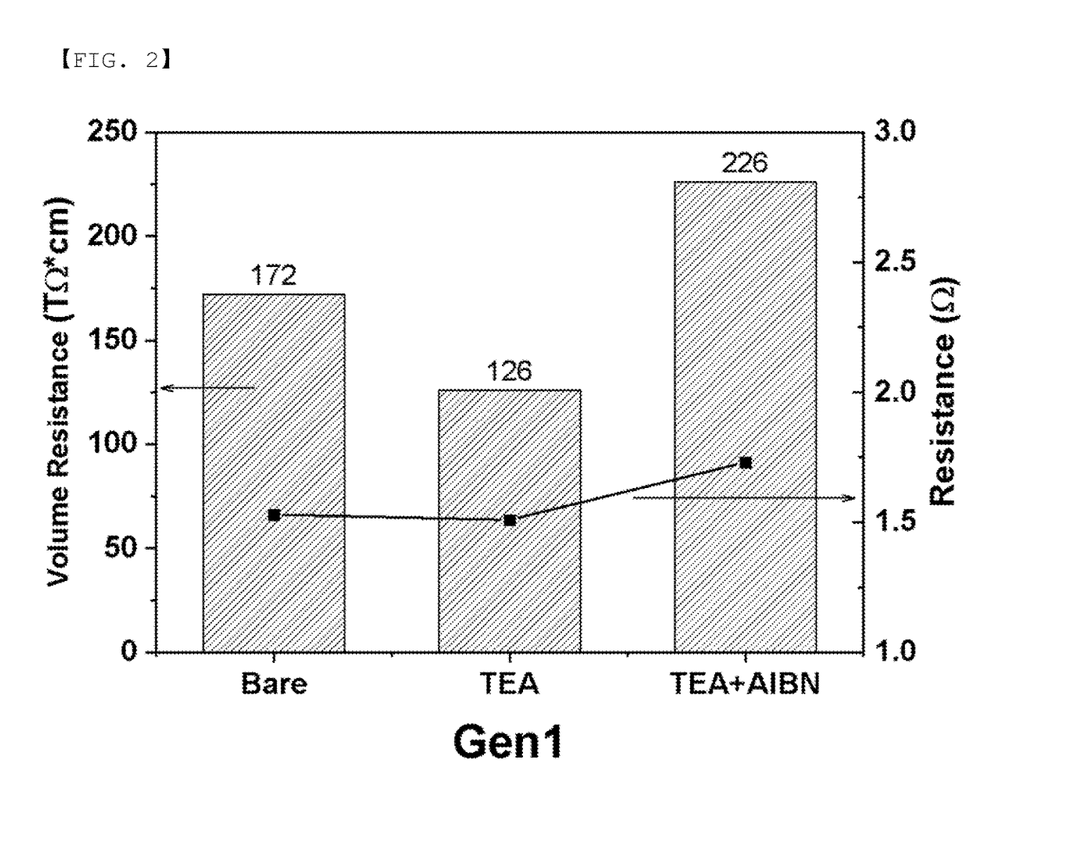
FIG. 2 is a graph the comparative measurement of volume resistance and resistance of a GEN 1 separator.
Figure 3:
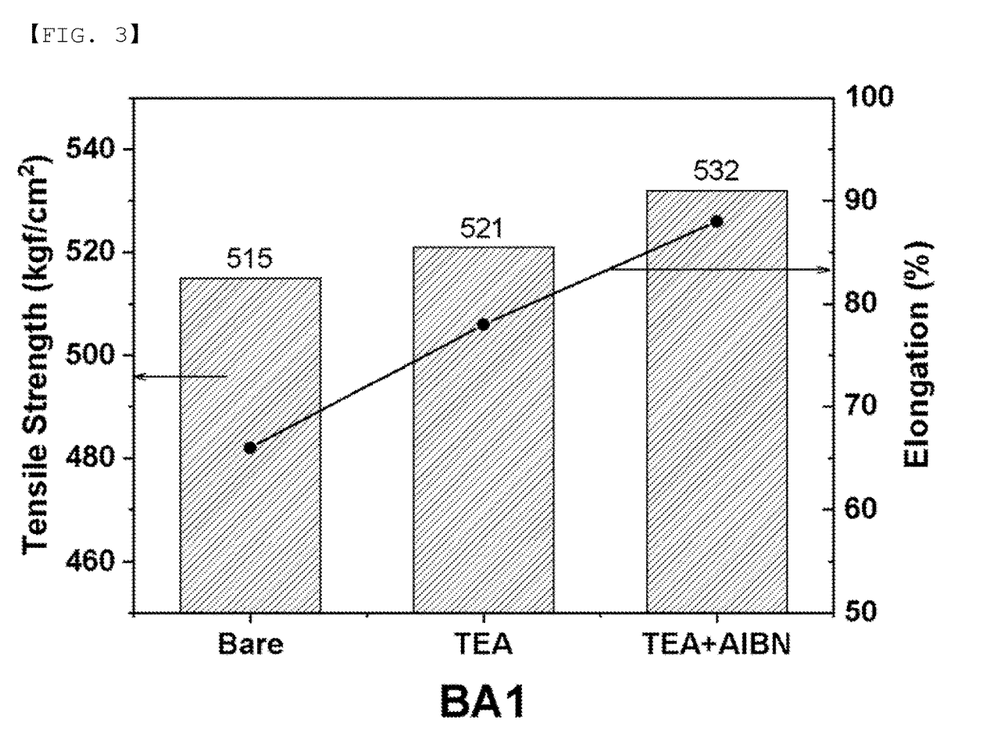
FIG. 3 is a graph showing the comparative measurement of tensile strength and elongation of a BA 1 separator.
Figure 4:
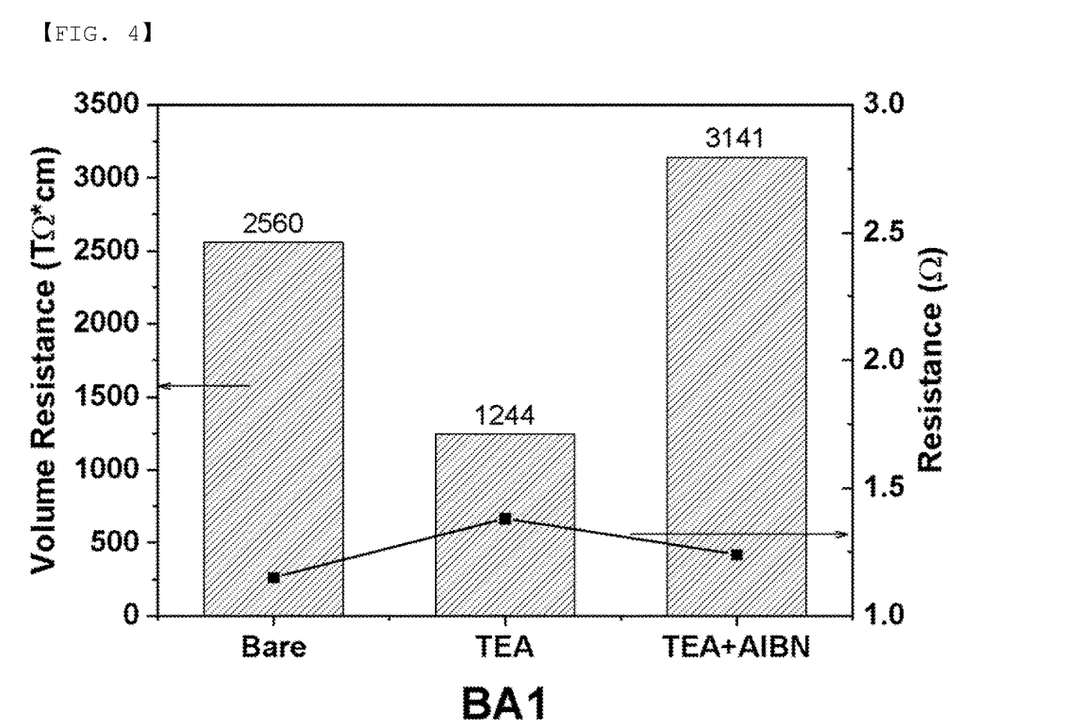
FIG. 4 is a graph showing the comparative measurement of volume resistance and resistance of a BA 1 separator.
Figure 5:
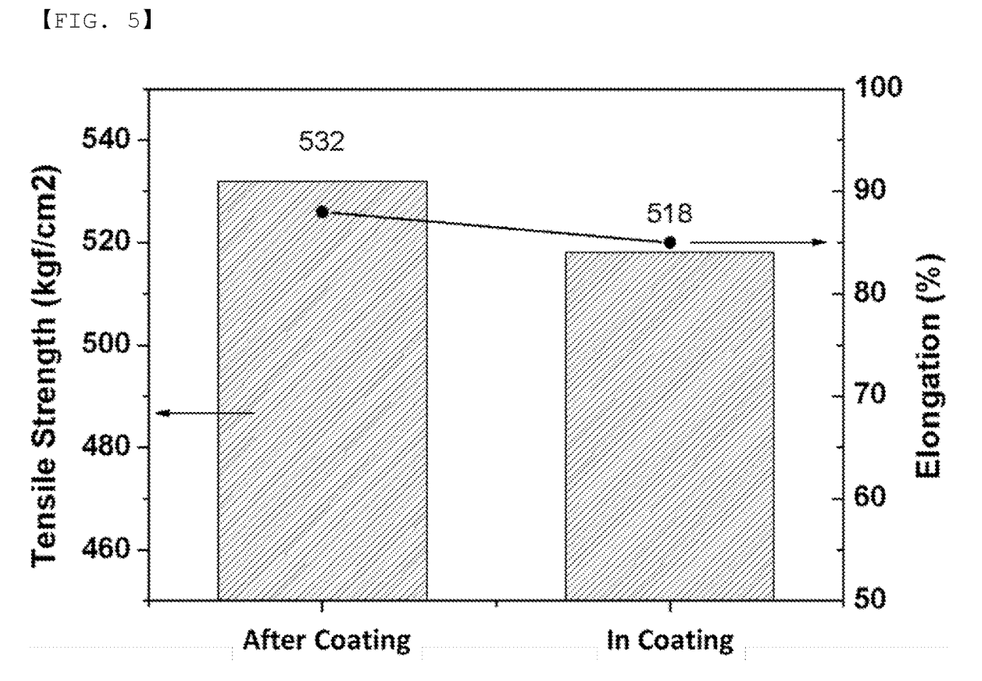
FIG. 5 is a graph showing the comparative measurement of tensile strength and elongation of a BA1 separator treated after coating and during coating.
Figure 6:
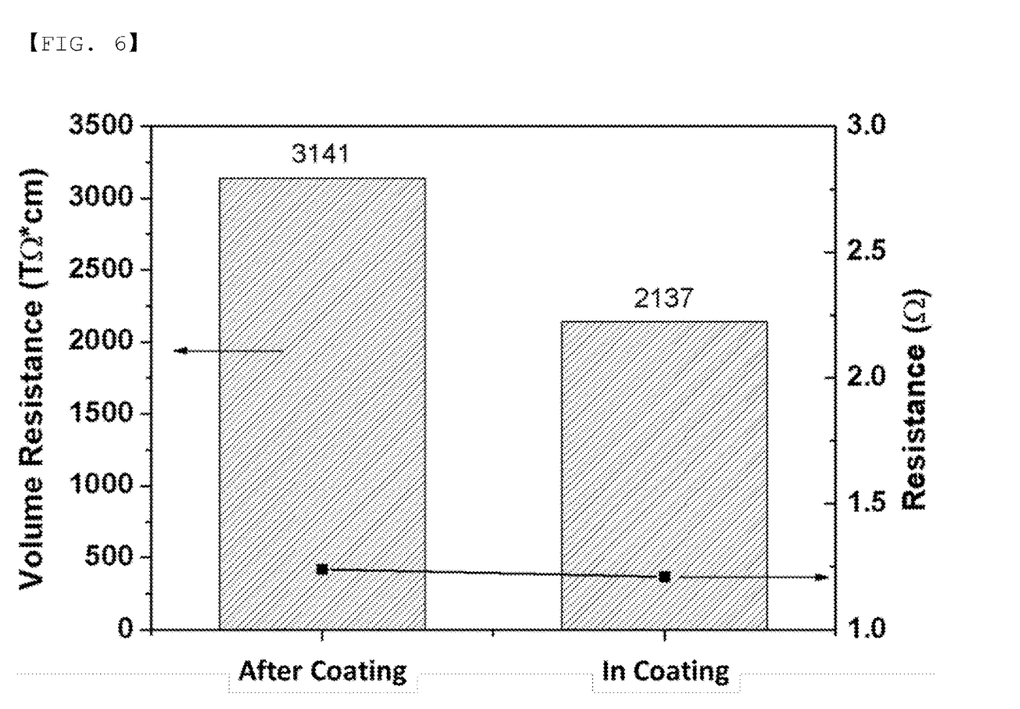
FIG. 6 is a graph showing the comparative measurement of volume resistance and resistance of a BA1 separator treated after coating and during coating.

Before forming the coating layer made of $Al_2O_3$ inorganic particles and PVDF binder on the separator 2, Comparative Example 3 was prepared by coating a slurry on the separator 2 after the slurry was prepared by adding triethylamine (TEA), which is a material for forming crosslinking sites, and 2,2'-azobis(isobutyronitrile) (AIBN) for crosslinking in the slurry preparation process of the coating layer material. The tensile strength, the elongation, the insulation resistance, and the resistance of the separators of Comparative Example 3 and Example 4, which performed triethylamine (TEA) and 2,2'-azobis(isobutyronitrile) (AIBN) treatment to the separator 2 according to the present invention, were measured respectively with the following conditions.
<Measurement Condition of Insulation Resistance>
  Applied voltage: 100V
  Measurement time: 3 S
  Size and shape of electrode: 19.6 cm² circular
<Measurement Condition of Tensile Strength>
  Width of separator: 1.5 cm
  Tensile speed: 500 mm/min
<Experiment Result>
FIGS. 5 and 6 show the measurement results of physical properties of Comparative Example 3 (In Coating) and Example 4 (After Coating) according to the present invention, respectively. Crosslinking during the process in the BA1 separator is Comparative Example 3 in which TEA and AIBN were added in the slurry preparation process of the coating layer. Post-treatment crosslinking in the BA1 separator is Example 4 in which TEA and AIBN treatment were performed after forming the coating layer.

It can be confirmed that the insulation properties (volume resistance) and the mechanical strength of Example 4, in which TEA and AIBN treatment were performed after forming the coating layer, are increased as compared with Comparative Example 3, in which TEA and AIBN were added in the slurry preparation process of the coating layer. Consequently, it can be seen that the separator having the post-treatment crosslinking is superior to the separator performing crosslinking during the coating process.

The invention claimed is:

1. A method for improving physical properties of a separator by post-treatment, comprising the steps of:
  a) preparing a separator for an electrochemical device comprising:
    a layer comprising a binder and inorganic particles,
    said layer present on an optional polyolefin substrate;

b) transforming the binder into a crosslinkable coupling part by performing deintercalation of elements present in the binder by treating the separator in a solution comprising a basic substance or a substance having an amine group is added to the separator, wherein the basic substance or the substance having an amine group is at least one selected from the group consisting of alkali metal oxide, alkaline earth metal oxide, zeolite, limestone, sodium carbonate, ammonia, mono-alkyl amine, bi-alkyl amine, and tri-alkyl amine, and wherein the alkyl contains 1 to 10 carbon atoms; and c) treating the separator with a crosslinking initiator after the deintercalation in step b), wherein when the separator is treated with the crosslinking initiator in step c, a crosslinking agent is selectively added at the same time, wherein step c) comprises:

a step of coupling the crosslinking initiator to the crosslinkable coupling part, coupling between the binders at the crosslinkable coupling part, forming a separate crosslinking between the crosslinking initiators, coupling the crosslinking agent to the crosslinkable coupling part, or forming a separate crosslinking between the crosslinking agents, wherein in step b), crosslinking sites are formed by performing deintercalation of elements present in the binder to transform a single bond into a double bond, and wherein the elements are H, F or Cl.

2. The method according to claim 1, wherein the inorganic particles are high-dielectric inorganic particles having a dielectric constant of 1 or more, inorganic particles having piezoelectricity, inorganic particles having lithium ion transfer ability, alumina hydrate, or a mixture of two or more thereof.

3. The method according to claim 1, wherein the binder is at least one selected from the group consisting of polyvinylidene fluoride (PVdF), polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), tetrafluoroethylene (TFE), fluoro rubber, and polyimide.

4. The method according to claim 1, wherein the crosslinking initiator is an azo-based compound or a peroxide-based compound.

5. The method according to claim 4, wherein the azo-based compound is at least one selected from the group consisting of 2,2'-azobis(2-methylbutyronitrile), 2,2'-azobis(isobutyronitrile), 2,2'-azobis(2,4-dimethylvaleronitrile), and 2,2'-azobis(4-methoxy-2,4-dimethylvaleronitrile).

6. The method according to claim 4, wherein the peroxide-based compound is at least one selected from the group consisting of tetramethylbutyl peroxyneodecanoate, bis(4-butylcyclohexyl)peroxydicarbonate, di(2-ethylhexyl)peroxydicarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethylhydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide.

7. The method according to claim 1, wherein the crosslinking agent at least one diaminoalkane having 1 to 15 carbon atoms.

8. The method according to claim 1, wherein the crosslinking agent is selected from at least one of the group consisting of 1,6-diaminohexane and 1,5-diaminopentane.

9. The method according to claim 1, wherein a temperature of treating the crosslinking initiator, and the crosslinking agent is in the range of 40° C. to 150° C.

10. The method according to claim 1, wherein an amount of the crosslinking initiator and/or the crosslinking agent is greater than 0 wt % and equal to or less than 5 wt % based on a total weight of a solid body in the separator.

* * * * *